United States Patent [19]

Aihara et al.

[11] Patent Number: 4,749,504

[45] Date of Patent: Jun. 7, 1988

[54] OIL-IN-WATER EMULSION AND USE THEREOF AS METAL PROCESSING OIL OR THE LIKE

[75] Inventors: Kazuo Aihara, Ohtake; Atsushi Deguchi; Tatsuo Kinoshita, both of Yamaguchi, all of Japan

[73] Assignee: Mitsui Petrochemical Industries, Ltd., Tokyo, Japan

[21] Appl. No.: 907,010

[22] Filed: Sep. 15, 1986

[30] Foreign Application Priority Data

Sep. 19, 1985 [JP] Japan .................. 60-205232
Sep. 19, 1985 [JP] Japan .................. 60-205233

[51] Int. Cl.$^4$ ............... C10M 173/00; C10M 145/02
[52] U.S. Cl. ......................... 252/49.5; 252/41; 252/56 D
[58] Field of Search ................ 252/49.5, 56 D

[56] References Cited

U.S. PATENT DOCUMENTS 3,407,143  10/1968  Pitchford ................ 252/49.5
4,073,761   2/1978  Bowman et al. ......... 252/49.5
4,506,056   3/1985  Gaylord .................. 524/531

FOREIGN PATENT DOCUMENTS 65205  12/1973  Japan .
112809   3/1976  Japan .
117595   7/1982  Japan .
277980   3/1984  Japan .

Primary Examiner—William R. Dixon, Jr.
Assistant Examiner—Ellen McAvoy
Attorney, Agent, or Firm—Sherman and Shalloway

[57] ABSTRACT

An oil-in-water emulsion of at least one polymer selected from the group consisting of (A) an ethylene/alpha-olefin random copolymer having
  (1) an ethylene content of 30 to 70 moles %,
  (2) a number average molecular weight (Mn) of 500 to 10,000, and
  (3) a weight average molecular weight (Mw) to number average molecular weight (Mn) ratio (Q=Mw/Mn), of 3 at most, and
  (4) being liquid at ordinary temperatures, and
(B) a graft-modified ethylene/alpha-olefin copolymer
  (1') comprising said ethylene/alpha-olefin copolymer having the characteristics (1) to (4) as a trunk polymer, and
  (2') at least one grafted unit selected from a unit derived from an unsaturated carboxylic acid or its acid anhydride and a unit resulting from neutralization of at least a part of said unit with an alkali, and
  (3') being liquid or semisolid at ordinary temperatures.

4 Claims, No Drawings

OIL-IN-WATER EMULSION AND USE THEREOF AS METAL PROCESSING OIL OR THE LIKE

This invention relates to an oil-in-water emulsion and its use. More specifically, this invention relates to an oil-in-water emulsion comprising a low-molecular-weight synthetic polymer having specific properties as an oil component, and its use as a metal cutting oil, a machining oil, a mold releasing agent, etc.

It has been known to use a normally liquid ethylene/alpha-olefin copolymer as a synthetic lubricant oil.

Japanese Laid-Open Patent Publication No. 112809/1976 describes a lubricant oil comprising as a viscosity index improver an ethylene/propylene copolymer having a propylene content of 37 to 60% by weight, a molecular weight distribution (Mw/Mn) of not more than 25, and an intrinsic viscosity, measured for its solution in toluene at 30° C., of 0.4 to 1.5.

Japanese Patent Publication No. 42723/1972 discloses a lubricant oil composition comprising a major proportion of a lubricant oil and a minor proportion of an ethylene/alpha-olefin ($C_3$-$C_{18}$) copolymer. The copolymer is characterized by having an ethylene content of 70 to 91 mole %, a crystallinity of about 3 to 18%, a Mw/Mn of not more than about 4 and a viscosity average molecular weight of about 10,000 to 200,000.

Japanese Patent Publication No. 21650/1972 describes a synthetic lubricant oil comprising an ethylene/propylene copolymer having a dynamic viscosity at about 99° C. of 1 to 60 centistokes, a viscosity index of at least 110, a pour point of not more than −32° C. and an ethylene content of 29 to 71 mole%.

Japanese Laid-Open Patent Publication No. 65205/1973 describes a lubricant comprising a major proportion of a lubricant oil and a minor proportion of an ethylene/propylene copolymer having a crystallinity of 1 to 25% and being suitable as a viscosity index improver.

Japanese Laid-Open Patent Publication No. 117595/1982 describes a synthetic lubricant oil comprising an ethylene/alpha-olefin copolymer having an ethylene content of 30 to 70 mole %, a number average molecular weight of 300 to 2,000 and a statistical molecular weight distribution with a Q value (Mw/Mn) of not more than 3.

Japanese Laid-Open Patent Publication No. 113352/1977 discloses a method of using a rolling oil, which comprises adding 20 to 50% of a vegetable oil having a pour point of not more than 5° C. and an iodine value of 90 to 110 to a highly viscous mineral oil, physically agitating the resulting mixed oil and water to form an emulsion having a concentration of 0.01 to 1, and applying the emulsion to the vicinity of the roll biting portion of a work roll side of a hot rolling machine in an amount of 0.05 to 233.0 g/m² (based on the mixed oil).

Japanese Laid-Open Patent Publication No. 227980/1984 describes a metal processing oil composition comprising (a) a lubricant oil component selected from oils and fats, mineral oils and fatty acid esters, and (b) a water-soluble polymeric compound having a basic nitrogen atom or a cationic nitrogen atom as essential ingredients. In the above metal processing oil composition, the lubricant oil component is not in the emulsified state, and therefore the composition differs from an aqueous emulsion.

Japanese Laid-Open Patent Publication No. 53599/1984 describes a multi-purpose emulsion-type composition for the production of heat-treated steel pipes comprising 0.1 to 60% of a natural or synthetic wax, 0.1 to 50% of a rust inhibitor, 0.1 to 30% of an oiliness enhancer, and 0.1 to 20% of an emulsifier.

As far as the present inventors know, however, no oil-in-water emulsion has been known heretofore which comprises an ethylene/alpha-olefin copolymer being liquid at ordinary temperatures or a graft-modified ethylene/alpha-olefin copolymer being liquid or semisolid at ordinary temperatures.

It is an object of this invention to provide an oil-in-water aqueous emulsion comprising an ethylene/alpha-olefin copolymer being liquid at ordinary temperatures.

Another object of this invention is to provide an oil-in-water aqueous emulsion comprising a graft-modified ethylene/alpha-olefin copolymer being liquid or semisolid at ordinary temperatures.

Another object of this invention is to provide an aqueous emulsion comprising a graft-modified ethylene/alpha-olefin copolymer which itself has surface-activating ability and can therefore be emulsified without using a surface-active agent.

Another object of this invention is to provide a metal rolling oil or a cutting oil comprising an ethylene/alpha-olefin copolymer which is liquid at room temperature or a graft-modified ethylene/alpha-olefin copolymer being liquid at ordinary temperatures.

Another object of this invention is to provide a metal rolling oil which forms a firm oil film on a metal surface and shows high lubricity.

Another object of this invention is to provide a metal rolling oil having high transparency which permits easy visual evaluation of a processed metal surface.

Another object of this invention is to provide a metal rolling oil comprising an aqueous emulsion which can be degreased easily, and is stable even when defrozen, or when its temperature is lowered or elevated at below the boiling point.

Another object of this invention is to provide a metal rolling oil, processing oil, such as a metal rolling oil, which without a rust inhibitor, has excellent rust resistance and is free from foamability.

Another object of this invention is to provide a cutting oil which by formation of a tough oily film, reduces the amount of bites worn, has sufficient heat resistance and can advantageously permit the removal of the amount of heat generated.

Further objects of this invention along with its advantages will become apparent from the following description.

According to this invention, the objects and advantages of this invention are achieved by an oil-in-water emulsion of at least one polymer selected from the group consisting of (A) an ethylene-alpha-olefin random copolymer having (1) an ethylene content of 30 to 70 mole %, (2) a number average molecular weight (Mn) of 500 to 10,000, and (3) a weight average molecular weight (Mw) to number average molecular weight (Mn) ratio (Q=Mw/Mn), of 3 at most, and (4) being liquid at ordinary temperatures, and (B) a graft-modified ethylene/alpa-olefin copolymer (1′) comprising said ethylene/alpha-olefin copolymer having the characteristics (1) to (4) as a trunk polymer, and (2′) at least one grafted unit selected from a unit derived from an unsaturated carboxylic acid or its acid anhydride and a unit resulting from neutralization of at least a part of said unit with an alkali, and (3′) being liquid or semisolid at ordinary temperatures.

As used herein and in the appended claims, the terms "normal temperature" and "ordinary temperatures" are used interchangeably and refer to temperatures of about 20° C., for example, normal temperature being from about 15° C. to 20° C.

The ethylene/alpha-olefin random copolymer or graft-modified ethylene/alpha-olefin copolymer above is used as an oil component of the oil-in-water emulsion of this invention.

The ethylene/alpha-olefin random copolymer used in the invention has an ethylene content of 30 to 70 mole %, preferably 40 to 60 mole %. If the ethylene content is less than 30 mole % or more than 70 mole %, the copolymer becomes solid, and strongly tends not to exhibit sufficient lubricating characteristics as a cutting oil, for example. Hence, ethylene contents outside the specified range are undesirable.

The alpha-olefin used as a copolymer component is preferably an alpha-olefin having 3 to 20 carbon atoms such as propylene, 1-butene, 1-pentene, 1-hexene, 1-octene, 1-decene, 1-dodecene, 1-tetradecene, 1-hexadecene, 1-octadecene, and 4-methyl-1-pentene. Of these, alpha-olefins having 3 to 14 carbon atoms, especially 3 to 11 carbon atoms and above all propylene, butene-1 and hexene-1, are preferred. These alpha-olefins may be used in combination.

The ethylene/alpha-olefin random copolymer has a number average molecular weight (Mn) of 500 to 10,000, preferably 600 to 5,000. If its number average molecular weight is lower than 500, the copolymer has a low ignition point, and does not easily form a tough oil film when used as a cutting oil or metal rolling oil. If its average molecular weight exceeds 10,000, the copolymer does not easily form a stable aqueous emulsion.

It is further necessary that the ethylene-alpha-olefin random copolymer be liquid at ordinary temperatures. An ethylene/alpha-olefin random copolymer which greatly tends to become solid at ordinary temperatures cannot easily form a stable oil-in-water emulsion.

The ethylene/alpha-olefin random copolymer used in this invention has a Q value (the weight average moledular weight/number average molecular weight ratio) of not more than 3, preferably not more than 2.8.

The ethylene content of the ethylene/alpha-olefin random copolymer can be measured by $^{13}$C-NMR analysis. The number average molecular weight of the copolymer is measured by GPC (gel permeation chromatography) calibrated in advance using standard substances of known molecular weights (monodisperse polystyrene and squalane). The Q value of the random copolymer is determined by preparing a calibration curve of the molecular weight and elution volume based on the measurement of a GPC count of a standard substance of a known molecular weight (monodisperse polystyrene, Mw=500−840×10$^4$, 16 pieces), determining the molecular weight of the copolymer from its GPC pattern using the calibration curve, and then calculating the Mw/Mn ratio.

The ethylene/alpha-olefin random copolymer further has a Z value, defined by the following equation, 10 to 300, preferably 15 to 300, especially preferably 15 to 200.

$$Z \text{ value} = M_{max}/M_{min}$$

wherein $M_{max}$ is the molecular weight of the copolymer which is shown by the maximum elution count of its GPC pattern, and $M_{min}$ is the molecular weight of the copolymer which is shown by the minimum elution count of its GPC pattern.

The above-mentioned range of the Z value means that the molecular weight distribution of the ethylene random copolymer is nearly a normal distribution.

The ethylene/alpha-olefin random copolymer used in this invention preferably has a $\sigma$ value (defined hereinafter) of 0.05 to 2, more preferably 0.1 to 1.

The ethylene random copolymer having the above-mentioned range of the $\sigma$ value has good transparency (i.e., not opaque).

The ethylene/alpha-olefin random copolymer in this invention preferably has an intrinsic viscosity [η], measured in decalin at 135° C., of 0.01 to 0.5 dl/g.

The ethylene/alpha-olefin random copolymer used in this invention can be produced, for example, by a method which comprises copolymerizing ethylene with an alpha-olefin continuously in the liquid phase using a catalyst formed from a soluble vanadium compound and an organoaluminum compound in the presence of hydrogen, wherein the concentration of the vanadium compound in the polymerization system is adjusted to at least 0.3 millimole per liter of the liquid phase, and the vanadium compound to be fed to the polymerization system is supplied as a dilution in a polymerization medium in a concentration not more than 5 times the concentration of the vanadium compound in the polymerization system (European Patent Application No. 60609).

The vanadium compound used may, for example, be compound represented by the general formula VO(OR)$_n$X$_{3-n}$ or VX$_4$ wherein R represents an aliphatic hydrocarbon group having 1 to 20 carbon atoms, X is a halogen, and $0 \leq n \leq 3$, such as VOCl$_3$, VO(OC$_2$H$_5$)Cl$_2$, VO(OC$_2$H$_5$)$_2$Cl, VO(C$_2$H$_5$)$_{1.5}$Cl$_{1.5}$, and VCl$_4$. The organoaluminum compound may, for example, be a compound of the general formula R$_m^1$AlX$_{3-m}$ wherein R$^1$ represents an aliphatic hydrocarbon group having 1 to 20 carbon atoms, preferably 1 to 6 carbon atoms, X$^1$ represents a halogen atom, and $1 \leq m \leq 3$, such as (C$_2$H$_5$)$_3$Al, (C$_2$H$_5$)$_2$AlCl, (C$_2$H$_5$)$_{2.5}$AlCl$_{1.5}$, (iso-C$_4$H$_9$)$_{1.5}$AlCl$_{1.5}$, (C$_2$H$_5$)AlCl$_2$, and mixtures of these.

An aliphatic, alicyclic or aromatic hydrocarbon preferably having 4 to 20 carbon atoms, such as pentane, hexane, heptane, octane, decane, dodecane, kerosene, cyclohexane, methylcyclopentane, and benzene, toluene, xylene and ethylbenzene may be used as the polymerization medium. The concentration of the vanadium compound in the liquid phase is at least 0.3 millimole/liter, preferably 0.5 to 20 millimole/liter. The concentration of the organoaluminum compound in the liquid phase may be such that the Al/V atomic ratio is within the range of from 2 to 50, especially from 3 to 20.

The copolymerization temperature is 0° to 100° C., especially 20° to 80° C., and the polymerization pressure is 0 to 50 kg/cm$^2$ (gauge), particularly 0 to 30 kg/cm$^2$ (gauge). The average residence time is 5 to 300 minutes, particularly 10 to 250 minutes. Polymerization conditions selected within these ranges may be preferably used in producing the random copolymer (A) used in this invention.

The graft-modified ethylene/alpha-olefin copolymer (B) used in this invention can be produced by using the same ethylene/alpha-olefin random copolymer as above as a trunk polymer, and modifying the copolymer by grafting. Modification by grafting can be easily carried out, for example, by reacting the ethylene/alpha-olefin copolymer with a grafting monomer in the presence of a radical generator such as an organic or inorganic peroxide.

The grafting monomer is an unsaturated carboxylic acid or its acid anhydride. Examples include unsaturated mono- and di-carboxylic acids having 3 to 15 carbon atoms or anhydrides thereof, such as acrylic acid, methacrylic acid, maleic acid, fumaric acid, itaconic acid, citraconic acid, bicyclo[2.2.1]hept-2-ene-5,6-dicarboxylic acid, maleic anhydride, itaconic anhydride, citraconic anhydride, bicyclo[2.2.1]hept-5-ene-2,3-dicarboxylic acid (himic acid) and its anhydride, bicyclo[2.2.1]hept-2-ene-5,6-dicarboxylic anhydride, oleic acid and linoleic acid. Of these, acrylic acid and maleic acid are especially preferred.

The resulting graft-modified reaction product can be directly formed into the aqueous emulsion. If desired, prior to a treatment for preparing the aqueous emulsion of this invention, the resulting graft-modified reaction product may be treated with an inorganic basic compound such as sodium hydroxide or potassium hydroxide, ammonia or an organic basic compound such as a mono-, di- or tri-alkylamine such as mono-, di- or trimethyl(or ethyl)amine, mono-, di- or tri-ethanolamine, or morpholine to form a carboxylate group resulting from neutralization of a part or the whole of the grafting monomer. The neutralization treatment may be carried out by any desired method. Furthermore, by performing the emulsion-forming treatment in the presence of the alkalies mentioned above, it is possible to form a carboxylate group resulting from neutralization of a part or the whole of the grafting monomer. It should be understood therefore that the graft-modified ethylene/alpha-olefin copolymer includes those having the aforesaid carboxylate groups.

The graft-modified ethylene/alpha-olefin copolymer used in this invention has about 1 to 60% by weight, preferably about 1 to 20% by weight, especially preferably 3 to 20% by weight, based on the copolymer, of the grafted modifying component (graft).

The graft-modified ethylene/alpha-olefin copolymer preferably has a number average molecular weight (Mn) of 500 to 10,000, particularly 600 to 5,000, and a Q value (Mw/Mn) of not more than 3, particularly not more than 2.8. The copolymer is liquid or semisolid at ordinary temperatures. Preferably, it is liquid at ordinary temperatures.

The oil-in-water emulsion of the polymer can be prepared by emulsifying the polymer with a surface-active agent. However, when the polymer is the graft-modified ethylene/alpha-olefin copolymer, an aqueous emulsion can be prepared from it without particularly using the surfactant since the graft-modified copolymer itself has excellent surface-activating ability.

The surfactant used in this invention may be nonionic, anionic or cationic. Examples of the nonionic surfactants are polyoxyethylene alkyl ethers, polyoxyethylene alkyl aryl ethers, sorbitan fatty acid esters, glycerin fatty acid esters, and polyoxyethylene alkylamines. Examples of the anionic surfactants are fatty acid salts, alkylsulfate ester salts, alkylbenzenesulfonic acid salts, alkylphenyl ether disulfonic acid salts, and sulfuric acid ester salts. Examples of the anionic surfactants are quaternary ammonium salts. Of these, the nonionic surfactants are preferably used. Nonionic surfactants having an HLB of 5 to 19, above all 10 to 15, are particularly preferred.

The aqueous emulsion of this invention can be produced, for example, by treating the ethylene/alpha-olefin copolymer (A) and/or the graft-modified ethylene/alpha-olefin copolymer (B) and the surfactant in the presence of water at a temperature, of for example, 0 to 100° C., preferably 20° to 100° C. by means of an emulsifying device such as a stirring-type emulsifier, a colloid mill or an ultrasonicating emulsifier.

When the graft-modified ethylene/alpha-olefin copolymer is used as the polymer, the emulsion may also be prepared by treating it under the above conditions in the absence of a surfactant by using the same device as above. If the graft-modified ethylene/alpha-olefin copolymer has a low degree of graft-modification, or it is used in combination with the unmodified ethylene/alpha-olefin copolymer, emulsification becomes easier by using the surfactant and the resulting emulsion is more stable.

The aqueous emulsion of this invention may contain 10 to 90% by weight, preferably 20 to 50% by weight, of the ethylene/alpha-olefin copolymer and/or the graft-modified copolymer thereof based on the total weight of the polymer and water. It may contain 0.5 to 50% by weight, preferably 10 to 30% by weight, of the surfactant and 90 to 10% by weight, preferably 80 to 50% by weight, of water, on the same basis.

The aqueous emulsion of this invention is of the oil-in-water type, and unless specially colored, it is usually semi-transparent to opalescent. The emulsion particles have a size of, for example, about 0.01 to 10 micrometers, preferably 0.05 to 3 micrometers.

As required, various additives such as a rust inhibitor, an antiseptic or a defoamer (e.g., a silicone oil) may be added to the aqueous emulsion of this invention. Usually, such additives are used in an amount of less than several percent, for example not more than 2%.

The aqueous emulsion of this invention has various advantages because the ethylene/alpha-olefin random copolymer and the graft-modified copolymer thereof used as an oil component have excellent heat stability and oxidation stability and the emulsion is of the oil-in-water type. For example, since it forms a tough oil film on a metal surface and shows high lubricating ability, it is very suitably used as a metal processing oil such as a metal rolling oil, a cutting oil, a pressing oil, or an actuation oil, and also as a mold releasing agent for aluminum die casting.

When the aqueous emulsion of this invention is used as a metal processing oil or a cutting oil, various additives may be incorporated. Examples are fungicides (e.g., amine compounds such as amine complexes or diethanolamine), rust inhibitors (such as sulfonic acid salts or esters), antiseptics and defoamers (e.g., silicone oils). The additives may be used in an amount of less than several percent, for example not more than 2%.

The Z value of the ethylene/alpha-olefin random copolymer can be determined as follows:

The number average molecular weight and weight average molecular weight of the copolymer are measured by a method disclosed, for example, in Journal of Polymer Science, Part A-II, vol. 8, pages 89–103 (1970).

Elution counts of a standard substance having a known molecular weight (e.g., 16 samples of monodisperse polystyrene having different molecular weights selected from the range of 500 to 840×10$^4$) are measured by GPC, and a calibration curve showing the relation between the molecular weight and the elution count is prepared. The GPC pattern of a copolymer sample is taken by GPC. From the calibration curve, the molecular weight (Mi) at the individual counts (i) are read, and from the GPC pattern, the elution volumes (Ni) at the individual counts (i) are read. The number average molecular weight ($\overline{Mn}$) and weight average molecular weight ($\overline{Mw}$), both as polystyrene, of the copolymer sample can be calculated in accordance with the following equations.

$$\overline{Mn} = \Sigma MiNi/\Sigma Ni$$

$$\overline{Mw} = \Sigma Mi^2Ni/\Sigma MiNi$$

Separately, the molecular weight, calculated as polystyrene, of squalane (i.e., isoparaffinic standard substance having a molecular weight of 422) is measured by GPC. The minimum and maximum elution counts of the GPC pattern of the copolymer are read, and the corresponding minimum and maximum molecular weights of the copolymer, calculated as polystyrene, are read from the calibration curve. The Z value is thus calculated from the following equation.

$$Z \text{ value} = \frac{\text{Maximum molecular weight of the copolymer as polystyrene}}{\text{Minimum molecular weight of the copolymer as polystyrene}}$$

The $\sigma$ value can be calculated from the following equation.

$$\overline{E} = \sum_i EiWi/\sum_i Wi$$

$$\sigma = \sqrt{\sum_i (Ei - \overline{E})^2 Wi}$$

The copolymer is fractionated with acetone/hexane mixed solvent having various mixing proportions, and the ethylene content (Ei) and the weight ratio (Wi), based on the total weight of the copolymer, of the copolymer extracted in the i-th fraction are determined. The value represents a composition distribution of the copolymer.

The following examples illustrate the present invention in greater detail. All parts and percentages in these examples are by weight unless otherwise specified.

EXAMPLE 1

One hundred parts of ethylene/propylene copolymer having an ethylene content of 50 mole %, a Mn of 810, a Q value of 1.40, a Z value of 16 and a $\sigma$ value of 0.2 was reacted with 14 parts of maleic anhydride as a graft-modifying component in the presence of 3.3 parts of di-tertiary butyl peroxide with stirring at 160° C. for 4 hours. The reaction mixture was stirred for 2 hours under vacuum to give a maleic anhydride grafted ethylene/propylene copolymer which was pale yellow and liquid. The graft copolymer had a maleic anhydride content, determined by infrared spectroscopy, of 10.1%. The Mn and Q values of the graft-modified copolymer were the same as those of the unmodified copolymer.

One hundred parts of the modified copolymer was mixed with 100 parts of 2N aqueous potassium hydroxide solution, and the mixture was emulsified by a homomixer at 80° C. and 12,000 rpm. The resulting aqueous emulsion was a stable opalescent aqueous emulsion having an average particle diameter of 0.9 micron as measured by a Microtrac Particle Size Analyzer (Model 7991-3, Leeds and Northrup Corp.).

The performance of the aqueous emulsion was evaluated in its use in drilling on a large-sized radial drilling machine. The drill used was a twist drill having a diameter of 32 mm and a tip angle of 117°. Drilling was performed on a SUS 304 stainless steel plate having a thickness of 120 mm.

While a cutting oil prepared by diluting the resulting aqueous emulsion to 30 times was supplied to the radial drilling machine, the plate was drilled at a drill rotating speed of 300 rpm and a feed rate of 0.5 rpv/min. The number of holes that could be created was 300 per drill.

EXAMPLE 2

One hundred parts of a maleic anhydride-grafted ethylene/propylene random copolymer obtained in the same manner as in Example 1 was kneaded with 18 parts of morpholine at 80° C. Then, 118 parts of distilled water was added to the mixture. The mixture was gently stirred at 80° C. to give a pale yellow transparent microemulsion. The resulting aqueous emulsion had an average particle diameter, measured by a Submicron Particle Sizer (NICOMP Model 270, Nicomp Instruments, Inc.) of 0.07 micron.

The aqueous emulsion obtained was evaluated in the same way as in Example 1. The number of holes created was 300 per drill.

EXAMPLE 3

One hundred parts of an ethylene/hexene-1 copolymer having an ethylene content of 40 mole %, a Mn of 900, a Q value of 1.65, a Z value of 23 and a $\sigma$ value of 0.3 was modified with maleic acid in the same way as in Example 1, and emulsified with an equal weight of an aqueous potassium hydroxide solution. The resulting aqueous emulsion had an average particle diameter of 1.1 microns.

The performance of the resulting emulsion was evaluated in the same way as in Example 1. The number of holes that could be created was 250 per drill.

EXAMPLE 4

One hundred parts of the same ethylene/propylene copolymer as used in Example 1 was reacted with 26 parts of bicyclo[2.2.1]hept-2-ene-5,6-dicarboxylic acid as a graft-modifying component in the presence of 3.3 parts of di-tertiary butyl peroxide with stirring at 160° C. for 4 hours. The reaction mixture was stirred under vacuum to give a bicyclo[2.2.1]hept-2-ene-5,6-dicarboxylic acid grafted ethylene/propylene copolymer which was pale yellow and liquid. The graft copolymer had a bicyclo[2.2.1]hept-2-ene-5,6-dicarboxylic acid content, determined by infrared spectroscopy, of 20.0%. The Mn and Q values of the graft-modified copolymer were the same as those of the unmodified copolymer.

One hundred parts of the modified copolymer was mixed with 100 parts of 2N aqueous potassium hydroxide solution, and the mixture was emulsified by a homomixer at 80° C. and 12,000 rpm. The resulting aqueous emulsion was a stable opalescent aqueous emulsion having an average particle diameter of 0.8 micron as measured by the Microtrac Particle Size Analyzer (Model 7991-3, Leeds and Northrup Corp.).

The performance of the aqueous emulsion was evaluated in the same way as in Example 1. The number of holes that could be created was 250 per drill.

COMPARATIVE EXAMPLE 1

One hundred parts of a mineral oil was mixed with 30 parts of octyl stearate as a surface-active agent and 1 part of 2,6-ditertiary butyl phenol as an antioxidant, and the mixture was emulsified to an oil/water ratio of 50/50 to prepare an aqueous emulsion.

The resulting aqueous emulsion was evaluated in the same way as in Example 1. The number of holes that could be created per drill was 100. This demonstrated the superiority of the aqueous emulsions of this invention to the comparative emulsion.

EXAMPLE 5

Twenty parts of polyoxyethylene nonylphenyl ether (HLB=10.7) as a surfactant was added to 100 parts of the same ethylene/propylene copolymer as used in Example 1 to form an oil phase. Then, water was added to the oil phase at an oil/water weight ratio of 50/50, and the mixture was emulsified by a homomixer at 80° C. and 12,000 rpm. The resulting aqueous emulsion was a stable opalescent aqueous emulsion having an average particle diameter, measured by the Microtrac Particle Size Analyzer (Model 7991-3, Leeds and Northrup Corp.), of 1 micron.

One hundred parts of the resulting emulsion was mixed with 1 part of stearylamine oleate (antioxidant) and the mixture was diluted to 30 times to prepare a cutting oil.

The performance of the cutting oil was evaluated in the same way as in Example 1. The number of holes that could be created per drill was 200.

EXAMPLE 6

Twenty parts of polyoxyethylene nonylphenyl ether (HLB=12.4) as a surfactant was added to 100 parts of ethylene/propylene copolymer having an ethylene content of 50 mole %, a Mn of 1,500, a Q value of 1.65, a Z value of 26 and a $\sigma$ value of 0.2 to form an oil phase. Water was added to the oil phase in such an amount as to provide an oil/water weight ratio of 40/60. The mixture was emulsified by a homomixer at 80° C. and 12,000 rpm. The resulting aqueous emulsion was opalescent and stable with an average particle diameter of 1 micron.

The performance of the aqueous emulsion was evaluated in the same way as in Example 1. The number of holes that could be created per drill was 200.

EXAMPLE 7

Twenty parts of polyoxyethylene nonylphenyl ether (HLB=10.7) as a surfactant was added to 100 parts of the same ethylene/hexene-1 copolymer as used in Example 3 to form an oil phase. Water was added to the oil phase in such an amount as to provide an oil/water weight ratio of 50/50. The mixture was emulsified by a homomixer at 80° C. and 12,000 rpm. The resulting aqueous emulsion was opalescent and stable with an average particle diameter of 1 micron.

The performance of the aqueous emulsion was evaluated in the same way as in Example 1. The number of holes that could be created per drill was 150.

EXAMPLE 8

Twenty parts of polyoxyethylene nonylphenyl ether (HLB=10.7) as a surfactant was added to 100 parts of the same ethylene/propylene copolymer as used in Example 1 to form an oil phase. Water was added to the oil phase in such an amount as to provide an oil/water weight ratio of 50/50. The resulting emulsion was a stable opalescent emulsion having an average particle diameter of 1 micron as measured by the Microtrac Particle Size Analyzer (Model 7991-3, Leeds and Northrup Corp.).

To evaluate the performance of the emulsion obtained in this Example, burning load was measured in accordance with the method of testing the strength of an oil film (the Soda four-ball type testing method) in Provisional Standards NDS XXK2704 of Ministry of Defence, Japan. Prior to testing, the emulsion was diluted to 20 times with distilled water. The results are shown in Table 1.

EXAMPLE 9

Twenty parts of polyoxyethylene nonylphenyl ether (HLB=12.4) as a surfactant was added to 100 parts of the same ethylene/propylene copolymer as used in Example 6 to form an oil phase. Water was added to the oil phase in such an amount as to provide an oil/water weight ratio of 40/60, and the mixture was emulsified by a homomixer at 80° C. and 12,000 rpm. The resulting emulsion was a stable opalescent emulsion having an average particle diameter of 1 micron.

The performance of the emulsion was evaluated in the same way as in Example 8. The results are shown in Table 1.

EXAMPLE 10

One hundred parts of the same ethylene/propylene copolymer as used in Example 1 was reacted with 14 parts of maleic anhydride as a graft-modifying component in the presence of 3.3 parts of di-tertiary butyl peroxide with stirring at 160° C./ for 4 hours to give a maleic anhydride-grafted ethylene/propylene copolymer which was pale yellow and liquid. The modified copolymer had a maleic anhydride content, measured by infrared spectroscopy, of 10.1%. The Mn and Q values of the modified copolymer were the same as those before modification.

Then, 100 parts of the resulting mofified copolymer was mixed with 100 parts of 2N aqueous potassium hydroxide solution, and the the mixture was emulsified at 80° C. and 12,000 rpm. The resulting emulsion was a stable opalescent emulsion having an average particle diameter, measured by a micro-track particle size distribution measuring device, of 0.9 micron.

The performance of the aqueous emulsion was evaluated in the same way as in Example 8, and the results are shown in Table 1.

EXAMPLE 11

One hundred parts of a maleic anhydride-grafted ethylene/propylene random copolymer obtained in the same manner as in Example 10 was kneaded with 18 parts of morpholine at 80° C. Then, 118 parts of distilled water was added to the mixture. The mixture was gently stirred at 80° C. to give a pale yellow transparent micro-emulsion. The resulting aqueous emulsion had an average particle diameter, measured by the Submicron Particle Sizer (NICOMP Model 270, Nicomp Instruments, Inc.), of 0.07 micron.

The aqueous emulsion obtained was evaluated in the same way as in Example 8, and the results are shown in Table 1.

EXAMPLE 12

One hundred parts of the same ethylene/propylene copolymer as used in Example 6 was reacted with 14 parts of maleic anhydride in the presence of 3.3 parts of di-tertiary butyl peroxide with stirring at 160° C. for 4 hours to give a maleic anhydride-grafted ethylene/propylene copolymer which was pale yellow and liquid. The maleic anhydride content of the modified copolymer, determined by infrared spectroscopy, of 9.5%. The Mn and Q values of the modified copolymer were the same as those of the unmodified copolymer.

One hundred parts of the modified copolymer was kneaded with 18 parts of morpholine at 80° C. Then, 118 parts of distilled water was added to the mixture, and the mixture was gently stirred at 80° C. to give a pale yellow aqueous emulsion The resulting aqueous emulsion was observed under an optical microscope, whereupon scale-like dispersed materials existed here and there. The dispersed materials were separated by using a 0.2-micron Teflon filter (Millipore Filter), and the resulting aqueous emulsion had an average particle diameter, measured by using the Submicron Particle Sizer (NICOMP Model 270, Nicomp Instruments, Inc.) was 2=0.1 micron.

The performance of the resulting emulsion was evaluated in the same way as in example 8, and the results are shown in Table 1.

EXAMPLE 13

One hundred parts of ethylene/butene-1 copolymer having an ethylene content of 40 mole %, a Mn of 900, a Q value of 1.65, a Z value of 21 and a value of 0.3 was graft-modified with maleic acid in the same way as in Example 8, and emulsified with an equal weight of aqueous potassium hydroxide solution to give an emulsion having an average particle diameter of 1.0 micron.

The performance of the emulsion was evaluated in the same way as in Example 8, and the results are shown in Table 1.

EXAMPLE 14

One hundred parts of the same ethylene/hexene-1 copolymer as used in Example 3 was graft modified with maleic acid in the same way as in Example 8, and emulsified with an equal weight of aqueous potassium hydroxide solution. The resulting emulsion had an average particle diameter of 1.1 microns.

The performance of the emulsion was evaluated in the same way as in Example 8, and the results are shown in Table 1

EXAMPLE 15

One hundred parts of the same ethylene/propylene copolymer as used in Example 1 was weakly stirred at 140° C., and 20 parts of acrylic acid and 3 parts of di-tertiary butyl peroxide were added dropwise gradually over the course of 8 hours to perform grafting reaction An acrylic acid-grafted ethylene/propylene copolymer which was pale yellow and liquid was obtained. The modified product had an acrylic acid content of 15.0% as measured by infrared spectroscopy. The Mn and Q values of the modified product were the same as those of the unmodified copolymer.

One hundred parts of the modified product was mixed with 100 parts of 3N aqueous potassium hydroxide solution, and the mixture was emulsified by a homomixer at 80° C. and 12,000 rpm. The resulting emulsion as a stable opalescent emulsion with an average particle diameter, measured by the Microtrac Particle Size Analyzer (Model 7991-3, Leeds and Northrup Corp.), of 2 microns.

The performance of the emulsion was evaluated in the same way as in Example 8, and the results are shown in Table 1.

EXAMPLE 16

One hundred parts of the same ethylene/propylene copolymer as used in Example 1 was weakly stirred at 140° C., and 22 parts of maleic anhydride and 7 parts of di-tertiary butyl peroxide were added dropwise gradually over the course of 8 hours to perform grafting reaction. A maleic anhydride-grafted ethylene/propylene copolymer which was pale yellow and liquid was obtained. The modified product had a maleic anhydride content of 17.0% as measured by infrared spectroscopy. The Mn and Q values of the modified product were the same as those of the unmodified copolymer.

Eighty parts of water was added to 20 parts of the modified product, and the mixture was emulsified by using a homomixer at 80° C. and 12,000 rpm. The resulting emulsion was a stable opalescent emulsion with an average particle diameter, measured by the Microtrac Particle Size Analyzer (Model 7991-3, Leeds and Northrup Corp.), of 0.5 microns.

A complex amine (Bioban P-1387) and $Na_2So_3$ were added as a rust inhibitor each in an amount of 0.2 part to the resulting emulsion, and the performance of the product was evaluated in the same way as in Example 8. The results are shown in Table 1.

COMPARATIVE EXAMPLE 2

Five parts of oleic acid and 2 parts of polyoxyethylene nonylphenyl ether as surfactants were added to a mixture of 70 parts of spindle oil and 30 parts of octyl stearate. Furthermore, 1 part of 2,6-di-tertiary butyl phenol was added as an antioxidant, and the mixture was emulsified so as to provide an oil/water ratio of 50/50.

The performance of the resulting emulsion was evaluated in the same way as in Example 8, and the results are shown in Table 1.

COMPARATIVE EXAMPLE 3

Five parts by weight of oleic acid and 2 parts of polyoxyethylene nonylphenyl ether were added as surfactants to a mixture of 70 parts of spindle oil and 30 parts of octyl stearate, and 1 part of triphenyl phosphite as an extreme pressure additive was added. The mixture was emulsified to as to provide an oil/water ratio of 50/50.

The performance of the emulsion was evaluated in the same way as in Example 8, and the results are shown in Table 1.

TABLE 1

| Metal processing oil | Burning load $(Kg/cm^2)$ |
|---|---|
| Example 8 | 9.9 |

TABLE 1-continued

| Metal processing oil | Burning load (Kg/cm$^2$) |
| --- | --- |
| Example 9 | 10.0 |
| Example 10 | 17.0 |
| Example 11 | 14.5 |
| Example 12 | 17.0 |
| Example 13 | 17.0 |
| Example 14 | 17.0 |
| Example 15 | 12.0 |
| Example 16 | 15.0 |
| Comparative Example 2 | 5.0 |
| Comparative Example 3 | 6.0 |

What is claimed is:

1. An oil-in-water emulsion comprising, as an oil a graft-modified ethylene/alpha-olefin copolymer comprising an ethylene/alpha-olefin copolymer as the trunk polymer having
   (1) an ethylene content of 30 to 70 mole %,
   (2) a number average molecular weight (Mn) of 500 to 10,000, and
   (3) a weight average molecular weight (Mw) to number average molecular weight (Mn) ratio (Q=Mw/Mn), of less than or equal to 3, and
   (4) being liquid at ordinary temperatures, and at least one grafted unit selected from the group consisting of a unit derived from an unsaturated carboxylic acid or its acid anhydride and a unit resulting from neutralization of at least a part of the unit with an alkali, said graft-modified ethylene/alpha-olefin copolymer being liquid or semisolid at ordinary temperatures, and water.

2. The emulsion of claim 1 also comprising a surface-active agent.

3. The emulsion of claim 1 wherein the amount of the grafted unit is about 1 to 60% by weight based on the graft-modified ethylene/alpha-olefin copolymer.

4. An oil-in-water emulsion comprising an ethylene-alpha-olefin random copolymer having
   (1) an ethylene content of 30 to 70 mole %,
   (2) a number average molecular weight (Mn) of 500 to 10,000.
   (3) a weight average molecular weight (Mw) to number average molecular weight (Mn) ratio (Q=Mw/Mn), of less than or equal to 3, and
   (4) being liquid at ordinary temperatures; a graft-modified ethylene/alpha-olefin copolymer comprising said ethylene/alpha-olefin copolymer having the characteristics (1) to (4) as a trunk polymer, and at least one grafted unit selected from the group consisting of a unit derived from an unsaturated carboxylic acid or its acid anhydride and a unit resulting from neutralization of at least a part of the unit with an alkali, said graft-modified ethylene/alpha-olefin copolymer being liquid or semisolid at ordinary temperatures, a surface-active agent and water.

* * * * *